R. E. NELSON.
DIRIGIBLE HEADLIGHT.
APPLICATION FILED MAR. 21, 1917.

1,234,792.

Patented July 31, 1917.
2 SHEETS—SHEET 1.

WITNESSES
Jas. E. McCathran
Chas. H. Kesler

INVENTOR
R. E. Nelson,
BY
E. G. Siggers
ATTORNEY

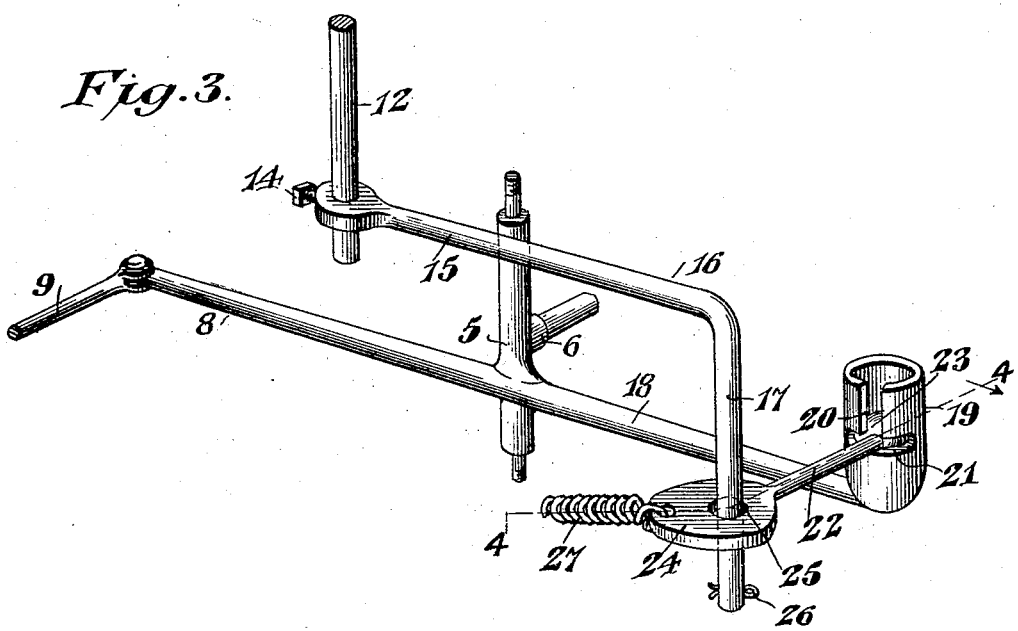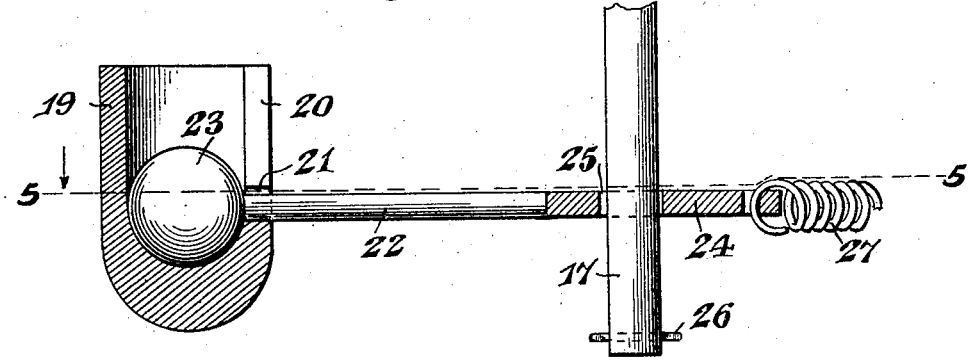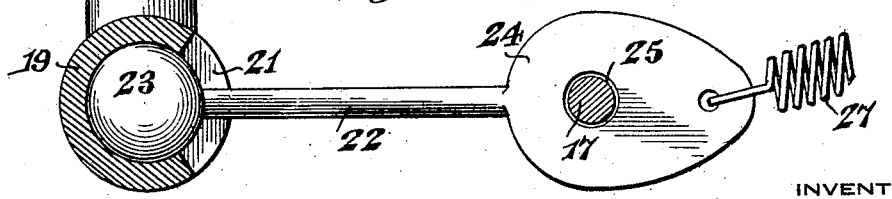

UNITED STATES PATENT OFFICE.

REUBEN EDGAR NELSON, OF SIMLA, COLORADO.

DIRIGIBLE HEADLIGHT.

1,234,792.  Specification of Letters Patent.  Patented July 31, 1917.

Application filed March 21, 1917. Serial No. 156,368.

*To all whom it may concern:*

Be it known that I, REUBEN EDGAR NELSON, a citizen of the United States, residing at Simla, in the county of Elbert and State of Colorado, have invented a new and useful Dirigible Headlight, of which the following is a specification.

This invention relates to dirigible headlights for automobiles, street cars, and the like.

These headlights are as a rule connected to the cross rod connecting the knuckle arms of the forward wheels and are simultaneously controlled, thereby shifting them in the same direction that the wheels turn so that the curve in the road is instantly lighted, whereby danger of accidents to the occupants of the car and to pedestrians upon the road or track is avoided. The construction generally outlined above, however, has been found to be defective in several particulars.

An object of the present invention is to provide a construction characterized by simplicity, durability and accuracy in responding to the several movements of the wheels.

Another object of the invention is to provide a construction in which the lamp at each side is directly connected to the knuckle pin at that side whereby one may operate independently of the other, should the latter become disarranged or broken, and in which both may describe the same arc of a circle as the wheels and also may respond proportionately to the turning of the wheels no matter which way they turn.

Another object of the invention is to provide a construction which will not interfere with the steering gear, should the construction become disarranged or broken, the connection between the wheels and the lamps being remote from the actuating mechanism of the former.

Another object of the invention is to provide a construction which will allow the body of the vehicle with the lamps attached thereto to yield without interfering with the connection between the lamps and the wheels, which does not impair the accuracy of their response, when it is necessary to turn the lamps, and which will absorb shocks and jars.

In the accompanying drawings, I have illustrated one embodiment of my invention, in which:—

Fig. 3 is an enlarged detail perspective view, showing the parts of the actuating mechanism connected to the knuckle pin.

Fig. 4 is an enlarged detail sectional view on the line 4—4 of Fig. 3, looking in the direction of the arrow.

Fig. 5 is an enlarged detail sectional view on the line 5—5 of Fig. 4, looking in the direction of the arrow.

Figure 1:
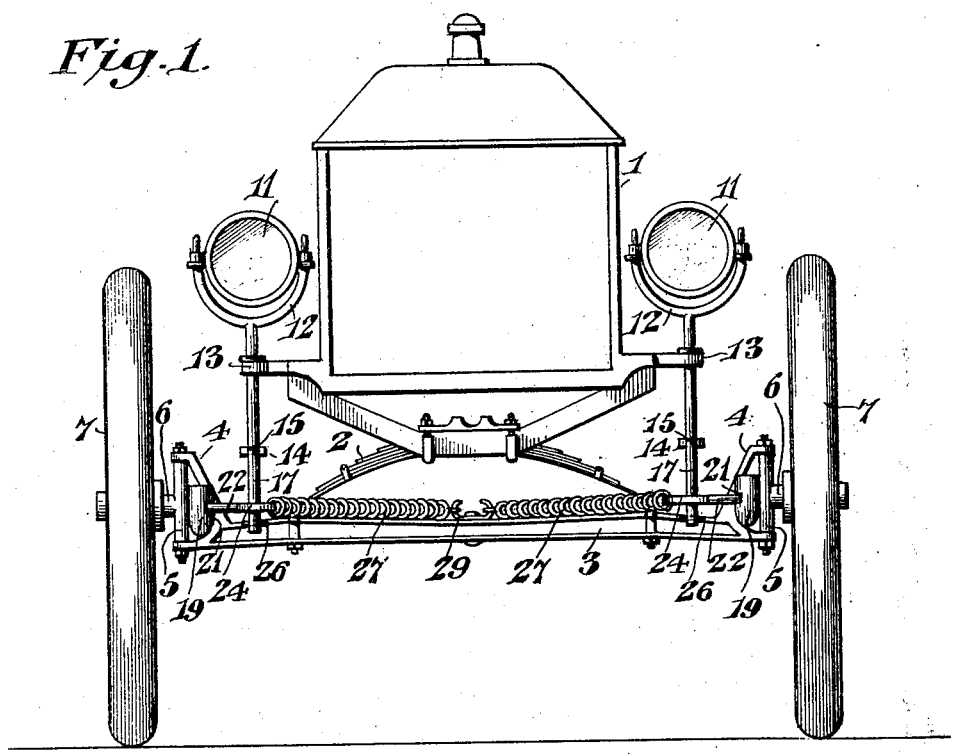
Figure 1 is a front elevation showing the application of my construction to an automobile of standard make.

In the embodiment here illustrated, the automobile comprises a body 1 connected by a leaf spring 2 to the axle 3. The ends of the axle are forked as shown at 4 between the arms of which are pivoted the knuckle pins 5 having the horizontal spindles 6 rotatably supporting wheels 7. Projecting rearwardly and fixed to the knuckle pins are arms 8 connected at their free ends by means of a cross rod 9. This cross rod is adapted to be actuated by suitable steering mechanism connected thereto at 10, the steering mechanism not being shown, as its construction is well known.

Lamps 11 are mounted at each side of the body and are provided with forks 12 rotatably journaled in brackets 13 fixed to the side of the body. Adjustably connected to the lower ends of the forks, as shown at 14, are cranks 15, as clearly shown in Figs. 2 and 3. Each crank comprises a horizontal forwardly extending portion 16 terminating in a downwardly extending vertical portion 17 at the end thereof remote from the fork.

Arms 18 are fixed to the knuckle pins 5 and form forwardly extending continuations of the arms 8. The forward end of each arm terminates in a cup-like socket 19 open at the top having through one side thereof a vertical slot 20 extending from the upper edge of the cup downwardly and terminating in a horizontal cross slot 21 at its lower end. A connecting rod 22 having a ball 23 at one end within the socket is adapted to swing back and forth within the horizontal slot. The vertical slot allows vertical swinging movement of the connecting rod as well as its removal. The socket 19 and the ball 23 constitute a ball and socket to allow the connecting rod universal movement. The rods 22 extend substantially transversely of the path of the automobile and are provided at their free ends with heads 24 having openings 25 through which the vertical portions 17 of the cranks slidably and loosely extend. In order to prevent the disengagement of the cranks from the connecting rods, the lower ends of the former are provided with cotter pins 26.

A spring 27 is attached at one end to each head 24 at the side thereof remote from the ball. The springs converge inwardly and have their inner ends connected to a hook 29 fixed to the axle.

The construction above described is such as to allow yielding movement of the body with its lamps relatively to the axle without straining or damaging the actuating mechanisms of the lamps or impairing their accuracy. During such movements, the vertical portions 17 simply ride up and down within the openings 25 of the heads 24 while the springs 27 tend to retain the rods 22 in horizontal position. The springs 27 also absorb jars and vibrations while the universal or ball and socket joint is such as to allow plenty of play and prevent strain. It should be noticed in this connection that the actuating mechanisms are connected directly to the knuckle pins and are substantially independent of the steering mechanism such as the cross rod 9. Should the mechanism connected to the lamp on one side become damaged or broken, it will be seen that this will not prevent the successful operation of the lamp upon the other side. Furthermore, should either or both of the actuating mechanisms for the lamps become broken, the parts broken are so arranged that they will be entirely out of the way of the steering mechanism comprising the arms 8, cross rod 9 and connection 10.

Figure 2:
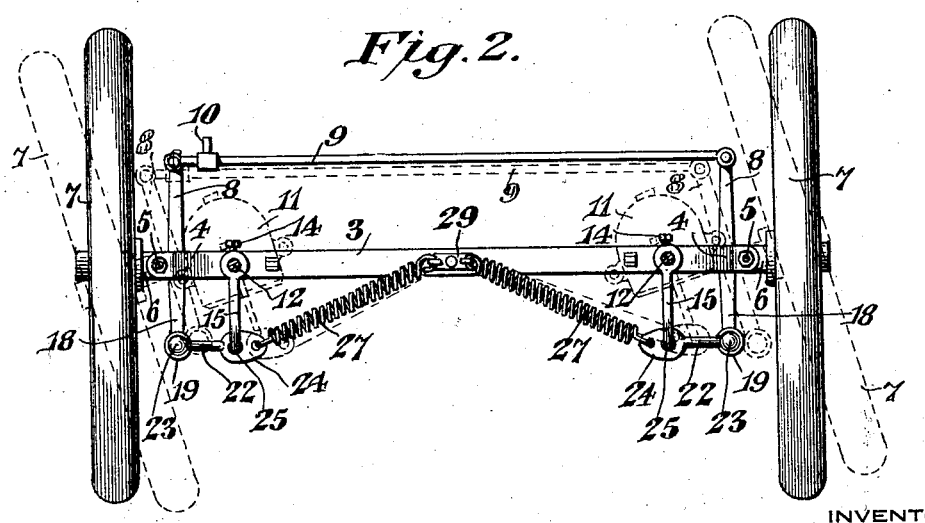
Fig. 2 is a plan view of the same with the body of the automobile removed.

When the wheels are turned, as shown in dotted lines in Fig. 2, it will be seen that the connecting rods 22 will exert a pull upon the cranks, turning the lamps in the same direction as the wheels. Should the wheels turn in the opposite direction, the connecting rods push the cranks from the position shown in full lines to the left of that shown in Fig. 2. The movement of the lamps is proportional at all times to the movement of the wheels and the arrangement is such that the lamps will turn the same amount to one side as to the other, providing the wheels also turn the same amount from one side to the other.

While I have shown and described one embodiment of my invention, it is to be understood that I do not desire to be limited to the details of construction herein shown and described for obvious modifications will be apparent to anyone skilled in the art.

What is claimed is:—

1. In an automobile head lamp control, a forked oscillatory lamp support, a crank connected with the support, and connections between the turning knuckle of an automobile and the crank, one of the connections being formed with a vertical socket, the other connection being loosely engaged with the crank for relative vertical displacement and having a ball terminal detachably engaged in the socket.

2. The combination with a vehicle comprising knuckle pins having wheels journaled thereon, of a lamp journaled upon said vehicle, an arm fixed to one of said knuckle pins, a crank attached to the lower end of said lamp, and a connecting rod loosely connected to said crank for free sliding movement of the latter and detachably pivoted to the arm for universal movement.

3. The combination with an automobile having a body, an axle, a spring interposed between said body and axle, a knuckle pin at the end of said axle, and a wheel supported by said knuckle pin, of a lamp journaled at one side of said body and provided at its lower end with a crank having a downwardly extending vertical portion, an arm on said knuckle pin, a connecting rod having detachable ball connection with the outer end of said arm and slidably engaging the vertical portion of said crank, and tension means connected with said rod and the axle.

4. The combination with a vehicle having an axle, steering wheels mounted upon the axle, steering mechanism and a lamp journaled upon the vehicle, of a crank attached to said lamp and having a vertically extending portion, a connecting rod pivoted at one end to said steering mechanism and having a head at its opposite end slidably engaging said vertical portion, and a spring connecting said head to the axle.

5. In an automobile head lamp control, a forked oscillatory lamp support, a crank connected with the support, connections between the turning knuckle of an automobile and the crank, one of the connections being formed with a vertical socket, the other connection being loosely engaged with the crank for relative vertical displacement and having a ball terminal detachably engaged in the socket, and tension means engaged with the last-named connection and with a stationary part of the automobile.

6. In an automobile lamp control, a forked oscillatory lamp support, a crank connected with the support, connections between the turning knuckle of an automobile and the crank, one of the connections being formed with a vertical socket, the other connection being loosely engaged with the crank for relative vertical displacement and having a ball terminal detachably engaged in the socket, and tension means engaged with the last-named connection and with a stationary part of the automobile, the vertical socket being provided with slits at right angles to each other for accommodating the connection when engaged in said socket.

7. In an automobile, a body, an axle, a spring interposed between said body and axle, knuckle pins having wheels at the outer ends of said axle, means for steering said wheels, a forwardly extending arm fixed to each pin, a lamp having a fork journaled at one side of said body, a crank attached to said fork and having a forwardly extending horizontal portion terminating in a downwardly extending vertical portion, a transversely extending connecting rod having a ball and socket connection at its outer end with the free end of said arm and slidably engaging at the inner end the vertical portion of said crank, and a spring connecting the inner end of said rod to the central portion of said axle for retaining the rod in horizontal position and absorbing shock.

In testimony, that I claim the foregoing as my own, I have hereto affixed my signature in the presence of two witnesses.

REUBEN EDGAR NELSON.

Witnesses:
W. C. HAWKINS,
M. R. DUBACH.

Copies of this patent may be obtained for five cents each, by addressing the "Commissioner of Patents, Washington, D. C."